(12) United States Patent
Tanaka et al.

(10) Patent No.: US 7,085,028 B2
(45) Date of Patent: Aug. 1, 2006

(54) HOLOGRAM RECORDING APPARATUS, HOLOGRAM RECORDING METHOD, AND HOLOGRAM RECORDING MEDIUM

(75) Inventors: Tomiji Tanaka, Miyagi (JP); Mikio Sugiki, Kanagawa (JP); Koji Ishioka, Kanagawa (JP); Shigeru Yamazaki, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/630,694

(22) Filed: Jul. 31, 2003

(65) Prior Publication Data

US 2004/0070802 A1  Apr. 15, 2004

(30) Foreign Application Priority Data

Aug. 21, 2002 (JP) .............................. 2002-241145
Aug. 26, 2002 (JP) .............................. 2002-245028
Jun. 25, 2003 (JP) .............................. 2003-180870

(51) Int. Cl.
*G03H 1/04* (2006.01)

(52) U.S. Cl. ............................ 359/35; 359/21; 359/30; 359/569

(58) Field of Classification Search .................. 359/35, 359/1, 28, 29, 30, 558, 566, 569, 572, 573, 359/575, 21
See application file for complete search history.

(56) References Cited

U.S. PATENT DOCUMENTS

| | | | | |
|---|---|---|---|---|
| 3,677,616 A | * | 7/1972 | Lewis | 359/28 |
| 3,862,357 A | * | 1/1975 | Kanazawa et al. | 386/128 |
| 5,311,360 A | * | 5/1994 | Bloom et al. | 359/572 |
| 5,892,601 A | * | 4/1999 | Curtis et al. | 359/22 |
| 5,986,781 A | * | 11/1999 | Long | 359/30 |
| 6,700,686 B1 | * | 3/2004 | King et al. | 359/11 |
| 6,822,797 B1 | * | 11/2004 | Carlisle et al. | 359/572 |
| 2004/0156083 A1 | * | 8/2004 | Sugiki et al. | 359/3 |

OTHER PUBLICATIONS

P. Hariharan, 'Optical Holography—Principles, techniques, and applications', Cambridge University Press, Cambridge, 1996, pp. 85, 114-115.*

* cited by examiner

*Primary Examiner*—Arnel C. Lavarias
(74) *Attorney, Agent, or Firm*—Oblon, Spivak, McClelland, Maier & Neustadt, P.C.

(57) ABSTRACT

A hologram recording apparatus, a hologram recording method and a hologram recording medium reduce noise components generated by a phase modulation type spatial light modulator, thus permitting improved integrity of data to be achieved. A light beam whose diffraction state has been controlled by a diffraction control element is condensed on a hologram recording medium. With this arrangement, a predetermined diffracted light component is removed from a diffracted light beam emergent from the diffraction control element when recording information, which is based on the diffraction state controlled by the diffraction control element, in a hologram recording medium. Thus, noise components when information is recorded can be reduced.

8 Claims, 13 Drawing Sheets

RELATIVE DISTANCE

RELATIVE DISTANCE

RELATIVE DISTANCE

RELATIVE DISTANCE

HOLOGRAM RECORDING APPARATUS, HOLOGRAM RECORDING METHOD, AND HOLOGRAM RECORDING MEDIUM

BACKGROUND OF THE INVENTION

1. Field of the Invention

The present invention relates to a hologram recording apparatus for recording data in a hologram recording medium, a hologram recording method and a hologram recording medium.

2. Description of the Related Art

Hologram recording apparatuses for recording data in hologram recording media have been developed.

A hologram recording apparatus is adapted to superimpose signal light modulated by a spatial light modulator on unmodulated reference light on a hologram recording medium to record an obtained interference pattern.

There are two types of spatial light modulators, namely, an intensity type and a phase modulation type. The intensity type spatial light modulator controls the quantity of transmitted or reflected light to perform modulation, and permits use of, for example, a liquid crystal display device.

The phase modulation type spatial light modulator partly changes a light phase to cause interference so as to generate the distribution of light intensity, and permits use of, for example, a grating light valve (GLV) made by Silicon Light Machine. In the phase modulation type, digital data can be recorded in a hologram recording medium by, for example, associating a status wherein only zero-order diffracted light is produced from the spatial light modulator with "1", while a status wherein only ±1-order diffracted light rather than the zero-order diffracted light is produced with "0," respectively.

A GLV technology has been disclosed by Patent Document 1, namely, the gazette of U.S. Pat. No. 5,311,360.

Our research results, however, have revealed that a phase modulation type spatial light modulator produce diversified types of diffracted light rather than only the zero-order diffracted light and the ±1-order diffracted light. Such diversified diffracted light turns into noises when recording data in a hologram recording medium, leading to a possibility of errors in decoding the data.

SUMMARY OF THE INVENTION

The present invention has been made with a view toward solving the problem described above, and it is an object of the invention to provide a hologram recording apparatus, a hologram recording method and a hologram recording medium that reduce noise components generated from a phase modulation type spatial light modulator, thus permitting higher integrity of data to be achieved.

To this end, according to one aspect of the present invention, there is provided a hologram recording apparatus including a laser source for emitting laser beams, a diffraction control element for receiving a laser beam emitted from the laser source and controlling the diffraction of the received laser beam before letting it exit, a diffracted light component blocking element for blocking a predetermined diffracted light component in the diffracted light emitted from the diffraction control element, and a condensing element for condensing a diffracted light component that has not been blocked by the diffracted light component blocking element onto a hologram recording medium.

Condensing the light whose diffraction condition has been controlled by the diffraction control element onto the hologram recording medium makes it possible to record the information associated with the diffraction condition in the diffraction control element on the hologram recording medium. A predetermined diffracted light component in diffracted light emitted from the diffraction control element is blocked by the diffracted light component blocking element, thus reducing noise components when recording the information.

As an example of the diffracted light component blocking element, a member with an aperture may be used to easily shut off a predetermined diffracted light component.

The hologram recording apparatus may include a hologram recording medium or a replaceable hologram recording medium. If the replaceable hologram recording medium is used, then the hologram recording apparatus preferably has a stage for retaining the hologram recording medium.

Alternatively, the diffraction control element may have a plurality of individual diffraction control elements for controlling the diffraction of the received laser beam independently from each other.

With this arrangement, information corresponding to the number of the individual diffraction control elements can be recorded in a hologram recording medium, permitting the recording to be achieved with even higher density.

The arrangement of the individual diffraction control elements in this case may be one-dimensional (linear) or two-dimensional (planar). If a member with apertures is used as the diffracted light component blocking element, then the configuration of the apertures is preferably formed into slits or pinholes according to the arrangement.

The diffracted light component blocking element may block tertiary or more diffracted light in terms of absolute value by the individual diffraction control element. This will reduce noise components when recording information and make it possible to maintain good reproducibility of data.

The individual diffraction control elements may have first and second phase control elements for controlling phase differences in outgoing light from individual elements.

Controlling the phase differences among emergent light emitted from the first and second phase control elements makes it possible to control the diffraction condition of the light resulting from combining the emergent light. For example, the diffraction condition of light can be controlled by adjusting the relative displacement amounts of the first and second phase control elements. Alternatively, however, one of the first and second phase control elements may be fixed and the other may be movable so as to control the diffraction condition of light by adjusting the displacement amount of the movable phase control element.

A third or more phase control elements may be added.

The first and second phase control elements are frequently small to a certain level (about the wavelength of light or less); therefore, the outgoing light from these elements is usually diffracted light that has been diffracted by the first and second phase control elements.

At this time, the diffracted light component blocking element preferably blocks primary diffracted light or more in terms of absolute values of the first and second phase control elements, respectively.

With this arrangement, the noise components can be reduced when recording information, allowing good reproducibility of data to be maintained.

The first and second phase control elements may have various shapes. For example, they may be substantially ribbon-shaped.

The ribbon-shape permits easy production and drive. For instance, using an electrically conductive, elastic material, such as a metal material, for the ribbon makes it possible to displace the elements by the electrostatic force based on a voltage applied to the ribbon, and reset to its original condition or shape by the elasticity of the ribbon. Thus, the first and second phase control elements and the individual diffraction control elements can be operated at high speed (e.g., about 1 µs).

The condensing element may be formed of a plurality of lenses. For example, the emergent light emitted from the diffraction control element is transmitted through two lenses to subject the light to Fourier transformation twice, so that diffraction spectra of the diffraction control elements can be used for recording in a hologram recording medium.

The hologram recording apparatus may be further equipped with a light dividing element for dividing a laser beam emitted from the laser source into first and second light beams and causing the first light beam to enter the diffraction control element, and a second condensing element for condensing the second light beam emitted from the light dividing element onto a spot on the hologram recording medium where a laser beam emitted from the condensing element has been condensed.

This arrangement makes it possible to divide a laser beam emitted from the laser source into a reference light beam not allowed to be transmitted through the diffraction control element and a signal light beam allowed to be transmitted through the diffraction control element. Both the reference light beam and the signal light beam are condensed on the hologram recording medium thereby permitting interference fringes of the reference light beam and the signal laser beam to be recorded on the hologram recording medium.

The light dividing element may be, for example, a half mirror.

The hologram recording apparatus may be further equipped with a light blocking element for blocking the first light beam emitted from the light dividing element and a light receiving element for receiving light emitted from the hologram recording medium on the basis of the laser beam converged onto the hologram recording medium by the second condensing element.

With this arrangement, the signal light beam emitted from the light dividing element is blocked from reaching the hologram recording medium so that only the reference light beam reaches the hologram recording medium, thereby causing the hologram recording medium to produce a signal light beam associated with recorded data. The recorded data can be reproduced by reading the produced signal light beam by the light receiving element.

The light receiving element is preferably matched with the diffraction control element that has produced the original signal. For instance, if the diffraction control element is constructed of one- or two-dimensionally arranged individual diffraction control elements, then the light receiving element is preferably constructed of individual light receiving elements arranged to match the individual diffraction control elements.

According to another aspect of the present invention, there is provided a hologram recording method including a diffraction control step for controlling the diffraction of a laser beam by a diffraction control element before letting the laser beam exit, a diffracted light component blocking step for blocking a predetermined diffracted light component in the diffracted light emitted in the diffraction control step, and a condensing step for condensing a diffracted light component that has not been blocked in the diffracted light component blocking step onto a hologram recording medium.

The light whose diffraction condition has been controlled by the diffraction control element is condensed onto the hologram recording medium so as to make it possible to record information associated with the diffraction condition in the diffraction control element on the hologram recording medium. Noise components while information is being recorded can be reduced by removing a predetermined diffracted light component from the diffracted light emitted from the diffraction control element by the diffracted light component blocking element.

The diffraction control element may have a plurality of individual diffraction control elements that control the diffraction of the received laser beam independently from each other.

With this arrangement, information corresponding to the number of the individual diffraction control elements can be recorded on the hologram recording medium, meaning that recording can be accomplished with further higher density.

In this case, the individual diffraction control elements may be arranged in a one-dimensional (linear) or two-dimensional (planar) layout.

Alternatively, the diffracted light component blocking element blocks tertiary diffracted light or more in terms of an absolute value by the individual diffraction control elements.

This arrangement reduces noise components when recording information, so that good data reproducibility can be maintained. An example of diffracted light to be blocked is tertiary diffracted light in a case where the individual diffraction control elements sequentially indicate the shortest cycle 0101 . . . .

Alternatively, the individual diffraction control elements may have first and second phase control elements for controlling phase differences among outgoing light from the individual elements.

The phase difference between the emergent light beams emitted from the first and second phase control elements is controlled so as to allow the control of the diffraction condition of the light resulting from combining the emergent light beams. In this case, a third or more phase control elements may be added.

The first and second phase control elements are frequently small to a certain level (about the wavelength of light or less); therefore, the outgoing light from these elements is usually diffracted light that has been diffracted by the first and second phase control elements.

At this time, the diffracted light component blocking element preferably blocks primary diffracted light or more in terms of absolute values by the first and second phase control elements, respectively.

With this arrangement, the noise components can be reduced when recording information, allowing good reproducibility of data to be maintained.

According to yet another aspect of the present invention, there is provided a hologram recording medium for recording data by using diffracted light obtained by blocking a predetermined diffracted light component in diffracted light emitted from a diffraction control element that controls the diffraction of a laser beam before letting the laser beam exit.

Noise components while information is being recorded in a hologram recording medium can be reduced by removing a predetermined diffracted light component from the diffracted light emitted from the diffraction control element.

DESCRIPTION OF THE PREFERRED EMBODIMENTS

The following will describe embodiments in accordance with the present invention in conjunction with the accompanying drawings.

First Embodiment

Figure 1:
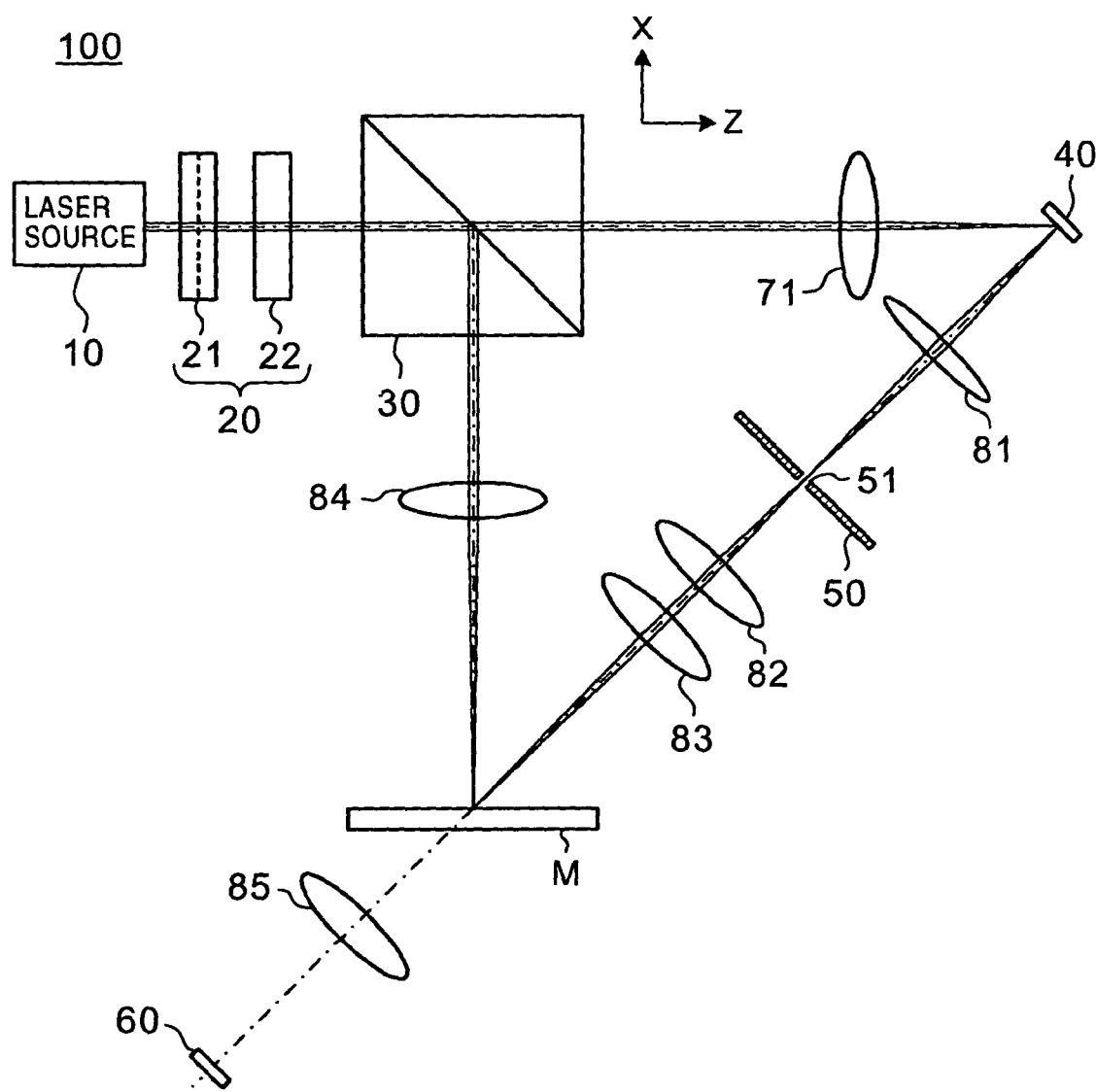
FIG. 1 is a schematic diagram showing a hologram recording apparatus in accordance with a first embodiment of the present invention.
Figure 2:
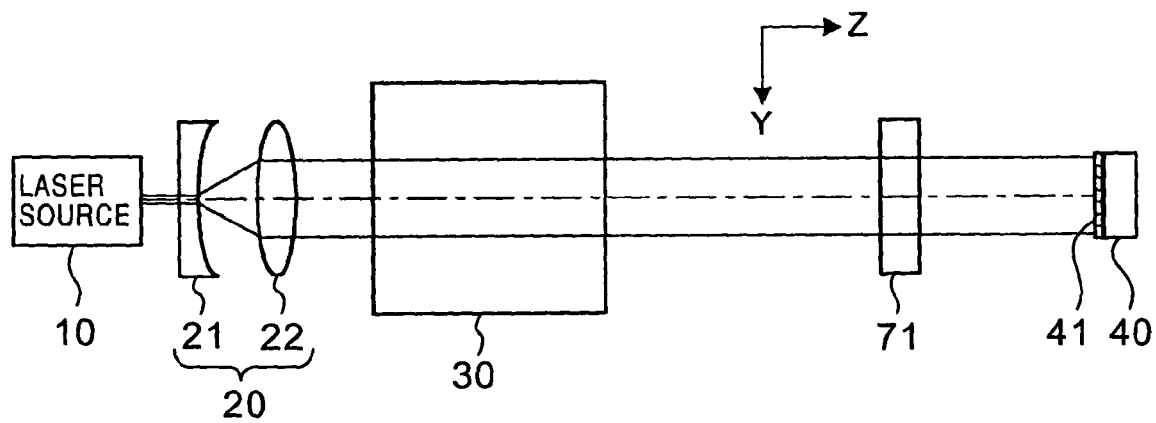
FIG. 2 is a schematic diagram showing the hologram recording apparatus observed from the direction of an X-axis in FIG. 1.

FIG. 1 is a schematic diagram showing a hologram recording apparatus 100 in accordance with a first embodiment of the present invention. FIG. 2 is a schematic diagram showing the hologram recording apparatus 100 observed from the direction of an X-axis in FIG. 1.

Referring to FIGS. 1 and 2, the hologram recording apparatus 100 is constructed of a laser source 10, a one-dimensional type beam expander 20, a half mirror 30, a one-dimensional type diffraction control element 40, a slit element 50, a one-dimensional type light receiving element 60, a cylindrical lens 71, and convex lenses 81 through 85 to record and reproduce information in and from a hologram recording medium M.

(Internal Configuration of the One-dimensional Type Diffraction Control Element 40)

First, the one-dimensional type diffraction control element 40 will be described.

Figure 3:
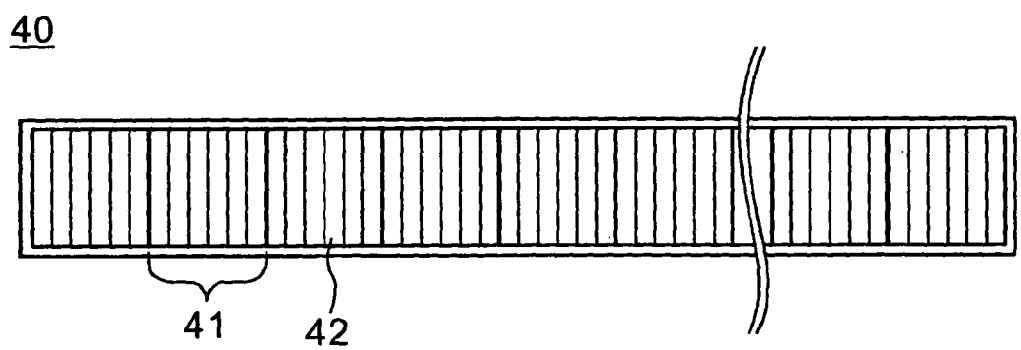
FIG. 3 is a top plan view showing a one-dimensional type diffraction control element shown in FIG. 1 observed from above.
Figure 4A:
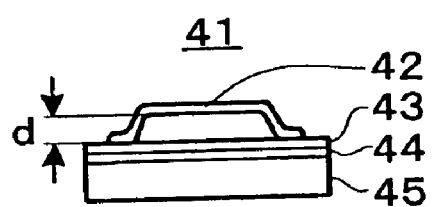
FIG. 4 is a top plan view showing the one-dimensional type diffraction control element shown in FIG. 1 observed sideways.
Figure 4B:
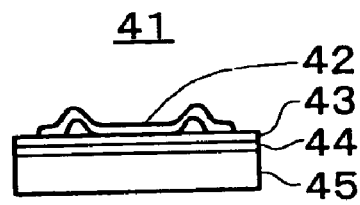
Figure 5A:
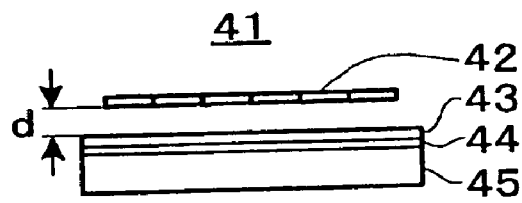
FIG. 5 is a front view of the one-dimensional type diffraction control element shown in FIG. 1 observed from front.
Figure 5B:
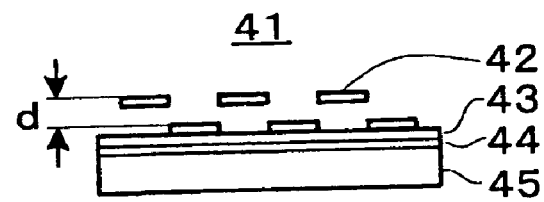

FIG. 3 is a top plan view of the one-dimensional type diffraction control element 40 observed from above. FIGS. 4 and 5 are a side view and a front view of the one-dimensional type diffraction control element 40 observed from a side surface and a front surface thereof, respectively. FIGS. 4A, 4B and FIGS. 5A, 5B illustrate two states (OFF and ON) respectively, of an individual diffraction control element 41. FIG. 5 schematically shows how a ribbon 42 works.

The one-dimensional type diffraction control element 40 is constructed of a plurality of individual diffraction control elements 41 arranged in direction Y. The individual diffraction control elements 41, which diffract incident light and emit it as diffracted light, are capable of controlling diffracting conditions independently from each other.

Each individual diffraction control element 41 has six ribbons 42, an insulating film 43 opposing the ribbons 42, and an opposing electrode 44, which are deposited on a substrate 45. The six ribbons 42 are each driven alternately so that three of the six ribbons are driven to the up position, while the remaining three ribbons are driven to the down position. Applying a voltage between the ribbons 42 and the opposing electrode 44 generates an electrostatic force therebetween, causing the ribbons 42 to be drawn to the opposing electrode 44 (refer to FIGS. 4B and 5B illustrating an ON state). Removing the voltage applied between the ribbons 42 and the opposing electrode 44 causes the ribbons 42 to be reset to their original conditions due to the elastic force of the ribbons 42 (refer to FIGS. 4A and 5A illustrating an OFF state).

Each of the ribbons 42 may be, for example, a few μm wide and about 100 μm long. A distance "d" may be set to a few hundred nm. At this time, the operating time of the ribbons 42 may be set to about 1 μs.

The following will describe a basic concept of the diffracted light generated by the individual diffraction control element 41 of the one-dimensional type diffraction control element 40. This concept is based on the idea that diffracted light other than zero-order and primary diffracted light from the ribbons 42 has low intensities and may be ignored.

As it will be discussed hereinafter, a variety of diffracted light beams is generated by the one-dimensional type diffraction control element 40, and the presence of these light beams cannot always be ignored; however, the following remains the basis on which data is recorded in the hologram recording medium M by the one-dimensional type control element 40. The diffracted light generated by the one-dimensional type diffraction control element 40 will be explained in detail later.

Considerations are given to a case where a laser beam is incident perpendicularly upon the one-dimensional type diffraction control element 40 (the individual diffraction control element 41). Referring to FIG. 5A, if the six ribbons 42 of the individual diffraction control element 41 are on the same plane (OFF state), then the laser beam is reflected perpendicularly and only the zero-order diffracted light is produced. If the ribbons 42 are alternately in the down position (ON state), as shown in FIG. 5B, then primary diffracted light is produced in addition to the zero-order diffracted light perpendicularly reflected.

At this time, the ratio of the zero-order diffracted light to the primary diffracted light from the one-dimensional type diffraction control element 40 depends on the distance d between the ribbons 42 in the down position and the ribbons 42 in the up position. If the distance d is $\lambda/4$ ($\lambda$: wavelength of the laser beam), then only the primary diffracted light is emitted. More specifically, the zero-order diffracted light from the ribbons 42 in the down position and the zero-order diffracted light from the ribbons 42 in the up position cancel each other, resulting in zero intensity. Thus, only the primary diffracted light remains.

The diffracted light obtained when the individual diffraction control element 41 is ON is formed of a mixture of diffracted light beams with their phases shifted from each other by half a wavelength from the ribbons 42 in the down position and the ribbons 42 in the up position, respectively. In other words, each of the ribbons 42 may be regarded as a variable-phase element capable of varying the phase of diffracted light by the displacement of the ribbons 42.

As described above, the individual diffraction control elements 41 making up the one-dimensional type diffraction control element 40 independently read the two diffraction states, namely, the OFF state wherein only zero-order diffracted light survives and the ON state wherein only the primary diffracted light survives. This makes it possible to express data of the number of bits equivalent to the number of pixels, namely, the number of the individual diffraction control elements 41. For example, 1088-bit data can be expressed by disposing 1,088 individual diffraction control elements 41.

The description has been given of the operation of the one-dimensional type diffraction control element 40, that is, the individual diffraction control elements 41, when a laser beam is directly incident. Basically, the same principle of operation applies to a case where a laser beam is incident aslant upon the one-dimensional type diffraction control element 40. The slant incidence, however, has a smaller difference in optical path length than the perpendicular incidence, so that only the primary diffracted light is emitted when the distance d is substantially $(\lambda/4)/\cos\theta$, the symbol $\theta$ denoting the incident angle of a laser beam with respect to the one-dimensional type diffraction control element 40.

(Other Constituent Elements)

The following will explain constituent elements other than the one-dimensional type diffraction control element 40.

A laser source 10 denotes a light source emitting laser beams.

The one-dimensional type beam expander 20 is constructed of a combination of a plano-concave lens 21 having a semi-elliptic cylindroid recession and a cylindrical lens 22 having an elliptic cylindroid shape, and serves as an optical element for enlarging the diameter of an incident light beam in a one-dimensional direction, namely, direction Y. A laser beam emitted from the laser source 10 passes through the one-dimensional type beam expander 20 to change its beam shape from a substantially circular shape to a substantially elliptic shape. The beam shape is changed to apply the light beam to all the individual diffraction control elements 41 disposed in direction Y of the one-dimensional type diffraction control element 40, as shown in FIG. 2.

The half mirror 30 is an optical element for splitting an incident light beam into two light beams.

A cylindrical lens 71 is an optical element for condensing incident light beams in direction X. The condensing is performed to match laser beams to the size of the one-dimensional type diffraction control element 40 in direction X.

A convex lens 81 is an optical element for forming a diffraction spectrum of the diffracted light emitted from the one-dimensional type diffraction control element 40.

A slit element 50 disposed near the focal point of the convex lens 81 is an optical element for removing a predetermined diffracted light component from the diffracted light emitted from the one-dimensional type diffraction control element 40, and functions as a diffracted light component blocking element. The slit element 50 has a slit 51 (aperture) to prevent a predetermined diffracted light component from passing through the slit 51.

Figure 6:
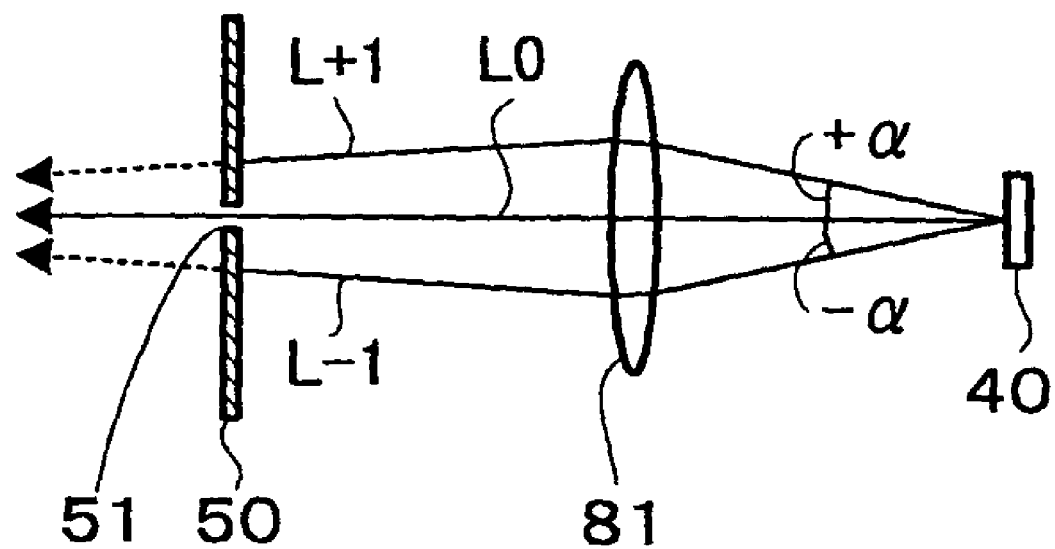
FIG. 6 is a schematic diagram showing a primary diffracted light beam from the one-dimensional type diffraction control element that is blocked by a slit element.

For instance, as shown in FIG. 6, a zero-order diffracted light beam L0 passes through the slit 51, while a primary diffracted light beam L1 (including both positive and negative primary diffracted light beams L+1 and L−1) cannot pass through the slit 51, thus being blocked by the slit element 50. This is because the primary diffracted light beam L1 is emitted at an angle ±α with respect to the zero-order diffracted light beam L1. Whether the angle α is positive or negative depends upon whether the primary diffracted light is positive or negative, i.e., whether +1 or −1 order).

The above description has been given of the case where outgoing light beams from the one-dimensional type diffraction control element 40 are limited to the zero-order and primary diffracted light beams from the ribbons 42.

As previously mentioned, however, not only the zero-order and primary diffracted light beams but also a variety of diffracted light beams are emitted from the one-dimensional type diffraction control element 40. The slit element 50, therefore, blocks not only the primary diffracted light beams from the ribbons 42 but also all diffracted light beams attributable to noises when recording information in the hologram recording medium M. This will be discussed in more detail later.

A convex lens 82 is an optical element for converting light beams emitted through the slit element 50 into substantially parallel light beams.

A convex lens 83 is an optical element for condensing the substantially parallel light beams emitted from the convex lens 82 onto the hologram recording medium M.

The two convex lenses 82 and 83 are used to record the diffraction spectrum itself of the diffracted light, from which the primary diffracted light beam has been removed by the slit 51, in the hologram recording medium M.

If only one of the convex lenses 82 and 83 is used, then diffracted light is subjected to Fourier transformation only once, and the real image of the one-dimensional type diffraction control element 40 is recorded in the hologram recording medium M. Since the primary diffraction component has been removed from the diffracted light by the slit element 50, the real image shows bright pixels having the ribbons 42 on the same plane (see FIG. 5A) and dark pixels having the ribbons 42 alternately set at the up and down positions (see FIG. 5B). In this embodiment, the diffraction spectrum itself of the diffracted light is recorded in the hologram recording medium M by using the convex lenses 82 and 83.

Data can be recorded in the hologram recording medium M either by the diffraction spectrum itself of the one-dimensional type diffraction control element 40 or the real image thereof.

A convex lens 84 is an optical element for condensing the light beams emergent from the half mirror 30 in a negative X direction onto the hologram recording medium M. The light beam emergent from the convex lens 84 is applied to the same spot on the hologram recording medium M where the light beam emergent from the convex lens 83 is applied, forming Interference fringes showing different intensity levels of light.

The hologram recording medium M is adapted to record the Interference fringes formed by the emergent light beams from the convex lenses 83 and 84 in terms of changes in refraction index. As the refraction index of the hologram recording medium M changes according to the amount of exposure, the Interference fringes are produced due to the interference between reference light and signal light, and the Interference fringes can be recorded in the hologram recording medium M as the changes in the refraction index.

As the material used for the hologram recording medium M, an organic or inorganic material may be used as long as the refraction index varies according to the intensity of light.

As an inorganic material, for example, a photo-refractive material, such as lithium niobate ($LiNbO_3$) whose refraction index varies according to the amount of exposure due to electro-optic effect may be used.

As an organic material, a photopolymerization type photopolymer, for example, may be used. In a photopolymerization type photopolymer in its initial state, a monomer is evenly distributed in a matrix polymer. Application of light causes the monomer to be polymerized in the exposed portion. As the polymerization proceeds, the refraction index in the portion changes.

A convex lens 85 is an optical element for condensing reproduction light used for reproducing recorded information from the hologram recording medium M onto the one-dimensional type light receiving element 60.

The one-dimensional type light receiving element 60 has a plurality of light receiving elements arranged in direction Y, receives reproduction light emergent from the convex lens 85, and outputs a signal based on the intensity of the received light. The one-dimensional type light receiving element 60 has light receiving elements that are one-dimensionally arranged in direction Y to correspond to the individual diffraction control elements 41 of the one-dimensional type diffraction control element 40.

Preferably, the number of the light receiving elements of the one-dimensional type light receiving element 60 is larger than the number of the diffraction control elements 41 of the one-dimensional type diffraction control element 40 so that a plurality of light receiving elements is associated with a single individual diffraction control element 41.

The one-dimensional type light receiving elements 60 may be replaced by a light receiving element equipped with a plurality of light receiving elements that are two-dimensionally or planarly arranged.

(Detailed Explanation of the Diffracted Light Emergent from the One-dimensional Type Diffraction Control Element 40)

The details of the diffracted light emergent from the one-dimensional type diffraction control element 40 will now be discussed.

In the above description, it has been mentioned that only the zero-order and primary diffracted light beams from the ribbons 42 are emergent from the one-dimensional type diffraction control element 40 and that diffracted light of other components can be ignored.

Our research results, however, have revealed that various types of diffracted light is produced from the one-dimensional type diffraction control element 40 and that the presence of those types of diffracted light cannot always be ignored. In other words, various types of diffracted light generated through the one-dimensional type diffraction control element 40 may be responsible for noises while data is being recorded in the hologram recording medium M.

Figure 7:
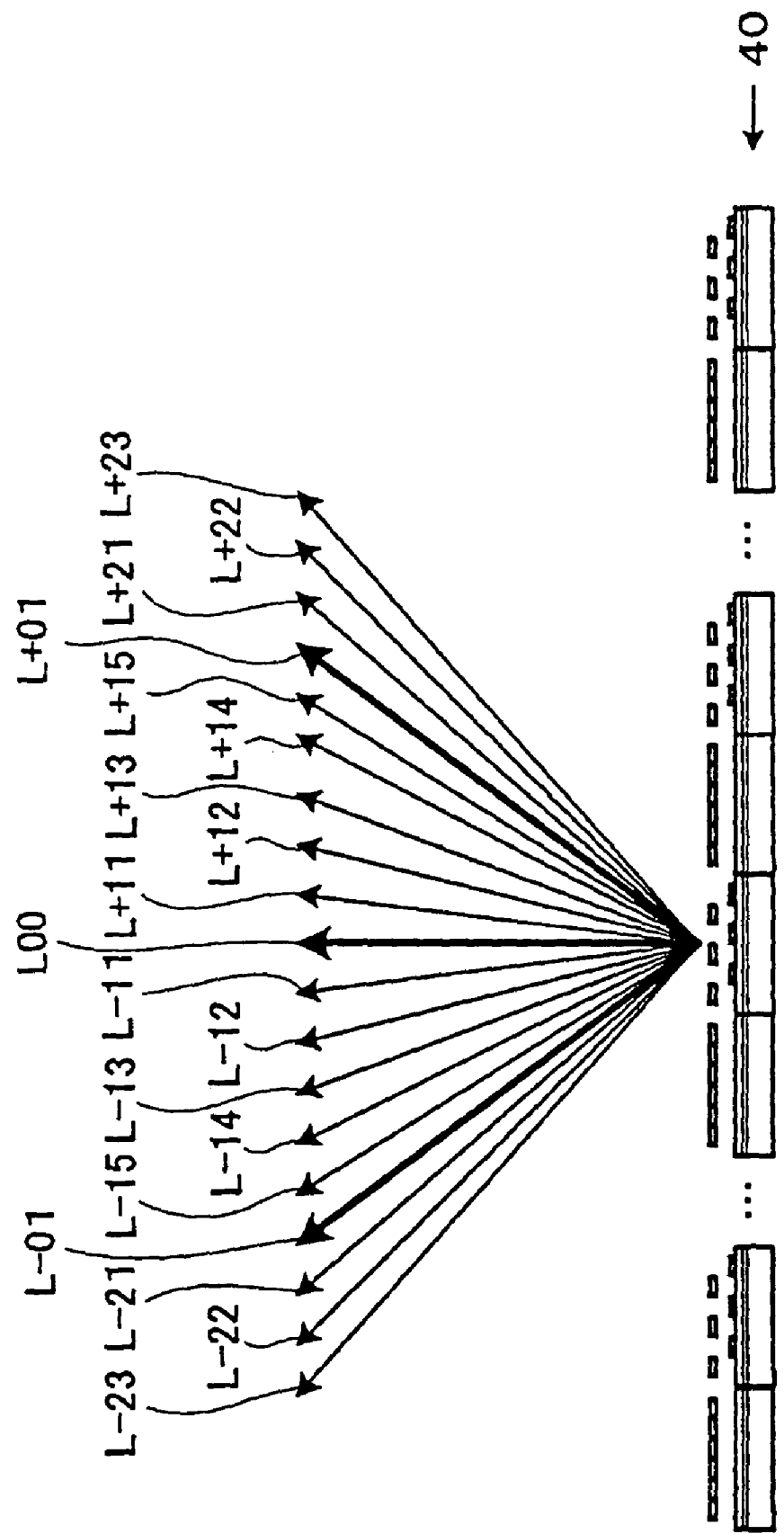
FIG. 7 is a schematic diagram showing the diffracted light from the one-dimensional type diffraction control element that is observed from a side face of the one-dimensional type diffraction control element.
Figure 8:
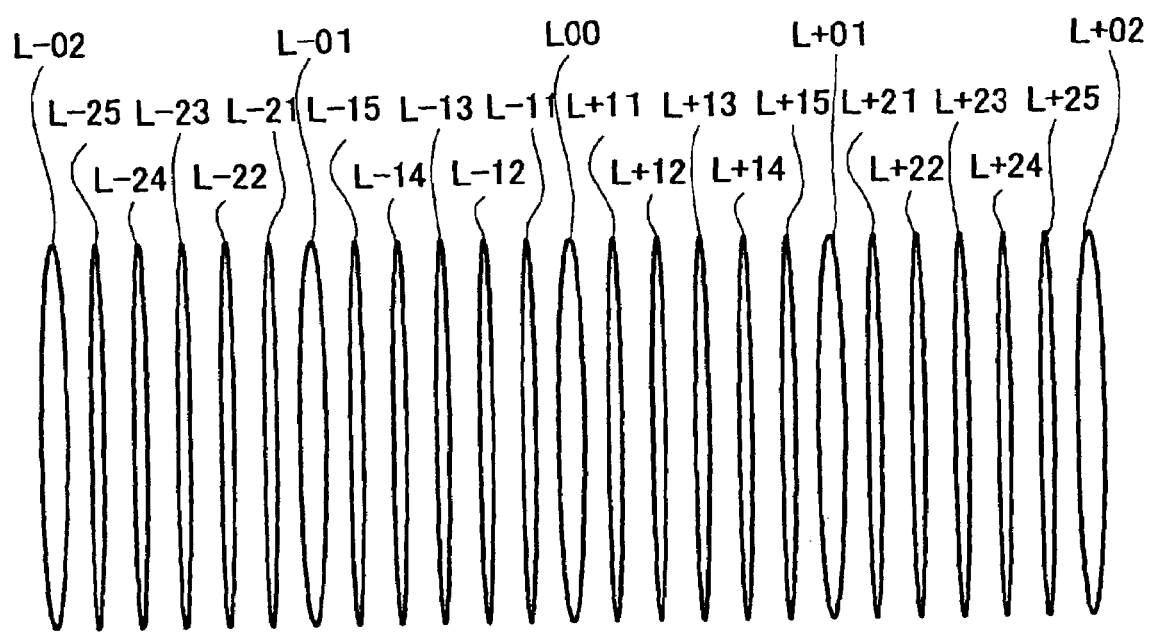
FIG. 8 is a schematic diagram showing diffracted light from the one-dimensional type diffraction control element, which is observed from the front of the one-dimensional type diffraction control element.

FIGS. 7 and 8 are schematic diagrams that schematically represent the diffracted light generated from the one-dimensional type diffraction control element 40 when the individual diffraction control elements 41 are alternately set to ON, that is, repetitive pattern of ON and OFF. FIG. 7 shows the diffracted light produced through the one-dimensional type diffraction control element 40, observed from a side surface of the one-dimensional type diffraction control element 40. FIG. 8 shows the diffracted light produced through the one-dimensional type diffraction control element 40, the diffracted light being projected onto a screen through a convex lens. In other words, FIG. 8 shows a Fourier image of a diffraction pattern that corresponds to the diffracted light from the front of the one-dimensional type diffraction control element 40.

Referring to FIGS. 7 and 8, the diffracted light beams from the one-dimensional type diffraction control element 40 of the ON/OFF repetitive pattern include the diffracted light beams from the individual diffraction control elements 41 ($L\pm11$, $L\pm12$, ..., $L\pm15$, $L\pm21$, ..., $L\pm25$, $L\pm31$, ...) in addition to the diffracted light beams from the ribbons 42 ($L00$, $L\pm01$, $L\pm02$, $L\pm03$, ...).

The diffracted light beams from the ribbons 42 are classified into the zero-order diffracted light beam $L00$, the primary diffracted light beam $L\pm01$, the secondary diffracted light beam $L\pm02$, the tertiary diffracted light beam $L\pm03$, and so on. In addition to the diffracted light beams from the ribbons 42 ($L00$, $L\pm01$, $L\pm02$, $L\pm03$, ...), there are the diffracted light beams from the individual diffraction control elements 41.

The diffracted light beams from the individual diffraction control elements 41 are classified into a first primary diffracted light beam $L\pm11$, a first secondary diffracted light beam $L\pm12$, a first tertiary diffracted light beam $L\pm13$, ..., a second primary diffracted light beam $L\pm21$, a second secondary diffracted light beam $L\pm22$, and a second tertiary diffracted light beam $L\pm23$. The diffracted light beams from the individual diffraction control elements 41 that match the diffracted light beams from the ribbons 42 ($L\pm01$, $L\pm02$, $L\pm03$, ...) may be referred to as first, second and third sextic diffracted light beams $L\pm16$, $L\pm26$ and $L\pm36$, respectively.

The zero-order diffracted light beam $L00$ and the primary diffracted light beam $L\pm01$ produced by the ribbons 42 correspond to the aforesaid zero-order diffracted light beam L0 and the primary diffracted light beam L±1 among the diffracted light beams.

As can be understood from the above description, the interval of the diffracted light beams from the individual diffraction control elements 41 is smaller than the interval of the diffracted light beams from the ribbons 42. Every sixth diffracted light beam from the individual diffraction control element 41 matches the diffracted light beam from the ribbon 42.

This is because the interval of diffracted light beams (the interval of emergent angles) corresponds to the grating interval of diffraction grating. This means that the interval of diffracted light beams decreases as the grating interval of diffraction gratings increases. The width of the ribbon 42 is smaller than the width of the individual diffraction control element 41, so that the interval of the diffracted light beams produced by the ribbons 42 is larger than the interval of the diffracted light beams produced by the individual diffraction control element 41. Furthermore, since six ribbons 42 correspond to the single individual diffraction control element 41, a sixth diffracted light beam from the individual diffraction control element 41 overlaps the diffracted light beam from the ribbon 42.

Thus, the repetitive pattern in which the individual diffraction control elements 41 are turned ON and OFF alternately is displayed by the one-dimensional type diffraction control element 40. This generates the diffracted light beams using the individual diffraction control elements 41 as the diffraction gratings thereof, i.e., the diffracted light beams from the individual diffraction control elements 41. In contrast to this, the diffracted light beams observed when all the individual diffraction control elements 41 are set to ON are only the diffracted light beams from the ribbons 42 (L00, L±01, L±02, L±03, . . . ), and the diffracted light beams from the individual diffraction control elements 41 may be actually ignored.

If every third individual diffraction control element 41 is set to ON/OFF, i.e., if a pattern repeating ON, ON, OFF, OFF is displayed, then the grating interval will be doubled, as compared with the case where ON and OFF is repeatedly displayed. Thus, the interval of the diffracted light beams will be reduced to half, causing the 12th diffracted light beam (12-order diffracted light beam) from the individual diffraction control element 41 to overlap the diffracted light from the ribbon 42.

The above applies also to a case where a pattern in which every fourth individual diffraction control elements 41 are repeatedly set to ON/OFF (ON, ON, ON, OFF, OFF, OFF) or every fifth individual diffraction control elements 41 are repeatedly set to ON/OFF (ON, ON, ON, ON, OFF, OFF, OFF, OFF) is displayed. The diffracted light beams are emergent from the individual diffraction control elements 41 according to a pattern repetition cycle.

Figure 9:
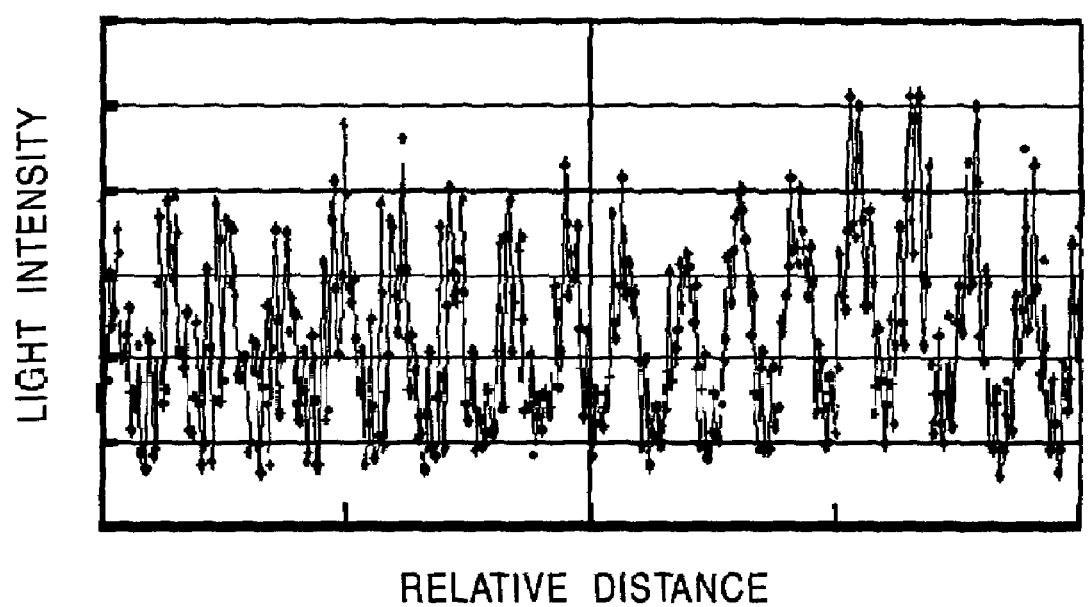
FIG. 9 is a graph showing an example of the light intensity distribution of the diffracted light from the one-dimensional type diffraction control element in a case where light is not transmitted through the slit element.

FIG. 9 is a graph showing the distribution of light intensity levels of the diffracted light beams from the one-dimensional type diffraction control element 40 when light is not passed through the slit element 50. The axis of abscissa indicates relative distance or position, while the axis of ordinate indicates the light intensity or white level at each position. The distribution of the white level is measured by receiving only signal light through the one-dimensional type light receiving element similar to the one-dimensional type light receiving element 60. The graph of FIG. 9 is associated with a real image converted from the Fourier image given in FIG. 8. The one-dimensional type diffraction control element 40 in FIG. 9 represents the pattern in which the individual diffraction control elements 41 repeat "1 and 0" ("ON and OFF").

Referring to FIG. 9, it can be seen that, if the slit element 50 is absent, then the diffracted light emergent from the one-dimensional type diffraction control element 40 includes many noises, especially high-frequency noises.

The slit element 50 removes the diffracted light turning into noises from the diffracted light emergent from the one-dimensional type light receiving element 60. More specifically, the width of the slit 51 of the slit element 50 is properly set in direction Y, with the zero-order diffracted light beam L00 being the center thereof, so as to block the diffracted light beams turning into noises.

Figure 10:
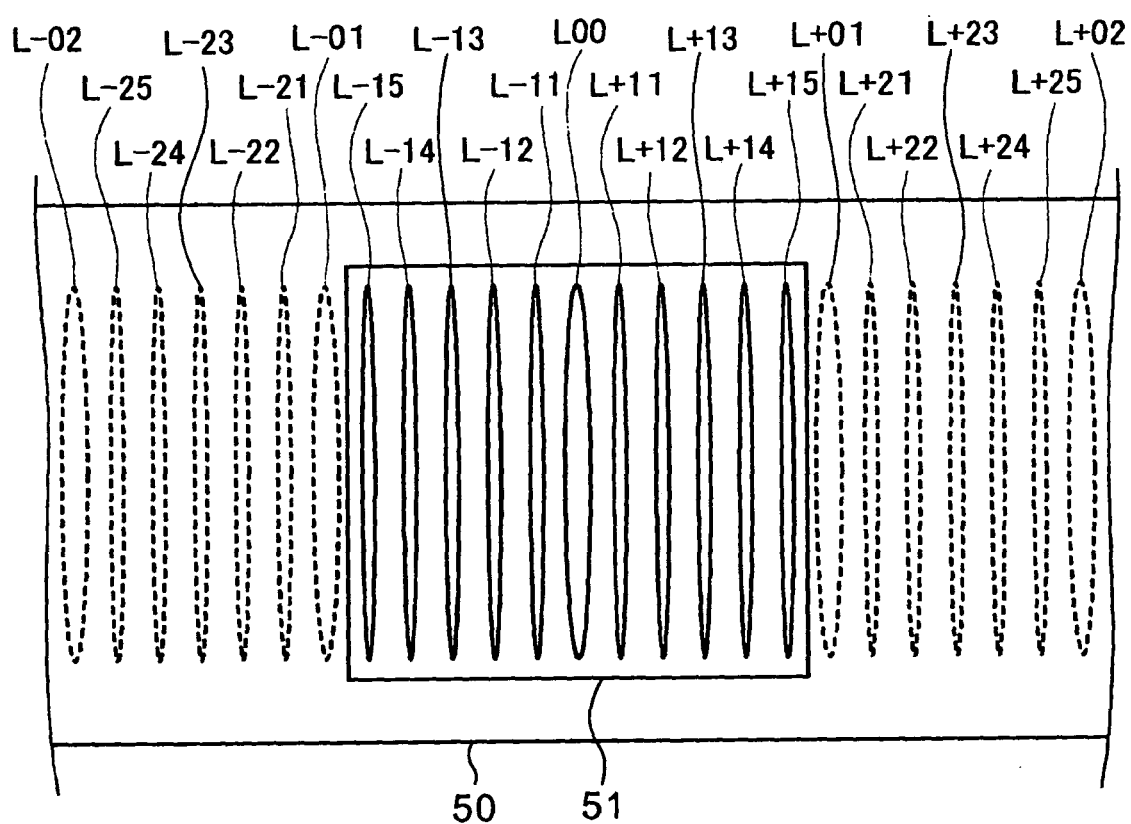
FIG. 10 is a schematic diagram illustrating a relationship of correspondence between a slit element and diffracted light when the diffracted light from a ribbon of a primary or more absolute value is blocked.

FIG. 10 is a schematic diagram showing a relationship of correspondence between the slit element 50 and diffracted light beams when the diffracted light beams from the ribbons 42 of primary or more absolute values (L±01, L±02 and so on) are to be blocked. In this case, a slit 51 passes the diffracted light beams L00, L±11 through L±15, whereas it blocks other diffracted light beams, including L±01, L±21 through L±25 and L±03.

Figure 11:
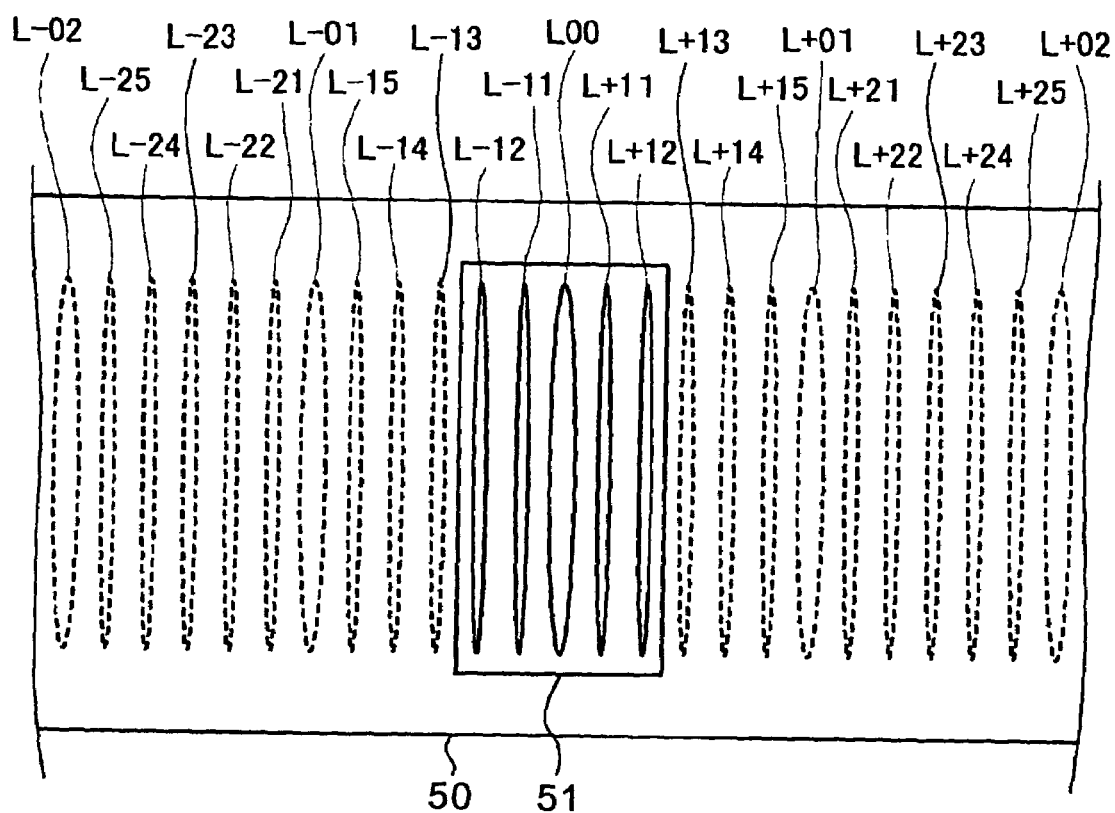
FIG. 11 is a schematic diagram illustrating a relationship of correspondence between a slit element and diffracted light when the diffracted light from an individual diffraction control element of a tertiary or more absolute value is blocked.

FIG. 11 is a schematic diagram showing a relationship of correspondence between the slit element 50 and diffracted light beams when the diffracted light beams from the individual diffraction control elements 41 of tertiary or more absolute values (L±13, L±14 and so on) are to be blocked. In this case, the slit 51 passes the diffracted light beams L00, L±11 through L±12, whereas it blocks other diffracted light beams, including L±13 through L±15, L±01, L±21 through L±25 and L±03.

Figure 12:
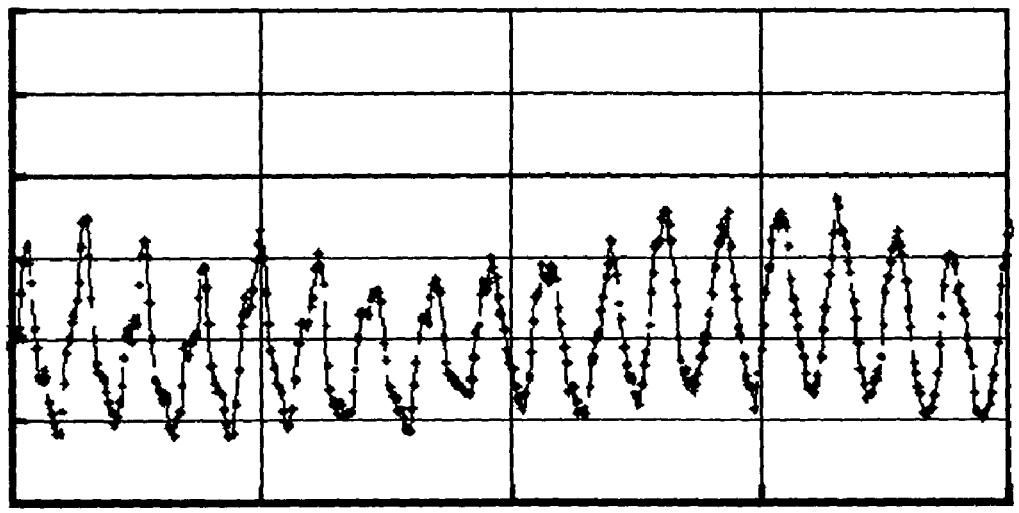
FIG. 12 is a graph showing an example of the light intensity distribution of the diffracted light from the one-dimensional type diffraction control element in a case where light is transmitted through the slit element shown in FIG. 11.

FIG. 12 is a graph showing the distribution of the white level of the diffracted light beams from the one-dimensional type diffraction control element 40 when the diffracted light beams are passed through the slit element 50 shown in FIG. 11. The distribution of the white level is measured by receiving only signal light through the one-dimensional type light receiving element similar to the one-dimensional type light receiving element 60. The one-dimensional type diffraction control element 40 in FIG. 11 represents the pattern in which the individual diffraction control elements 41 repeat "1 and 0" ("ON and OFF"), as in the case illustrated in FIG. 9.

It can be understood that the waveform shown in FIG. 12 indicates the signal is close to the desired signal to be produced.

As the width of the slit 51 is decreased, the diffracted light beams passing through the slit 51 will be more limited, allowing only the diffracted light beam L00 to pass. Seemingly, making the slit 51 narrower further reduces the diffracted light beams that would result in noises, leading to an improved signal-noise ratio for recording information in the hologram recording medium M.

However, our experiment results have revealed that making the slit 51 excessively narrow deteriorates the reproducibility of signals in some cases.

We have verified the influences of the width of the slit 51 on the reproducibility of signals when the individual diffraction control elements 41 of the one-dimensional type diffraction control element 40 represent a pattern in which "110" or "001" ("ON, ON, OFF" or "OFF, OFF, ON") is repeated. This is the shortest among repetitious patterns whose emergent ratios of "1" to "0" are not one to one, and a diffracted light beam L±19 overlaps a diffracted light beam L0±1.

At this time, to compare the reproducibility of signals, the slit 51 was set to three different widths: (1) a width that allow every diffracted light beam to pass (infinite width, meaning the absence of the slit element 50), (2) a width that allows only the diffracted light beams L00, L±11 and L±12 to pass, and (3) a width that allows only the diffracted light beams L00 and L±11 to pass.

Figure 13:
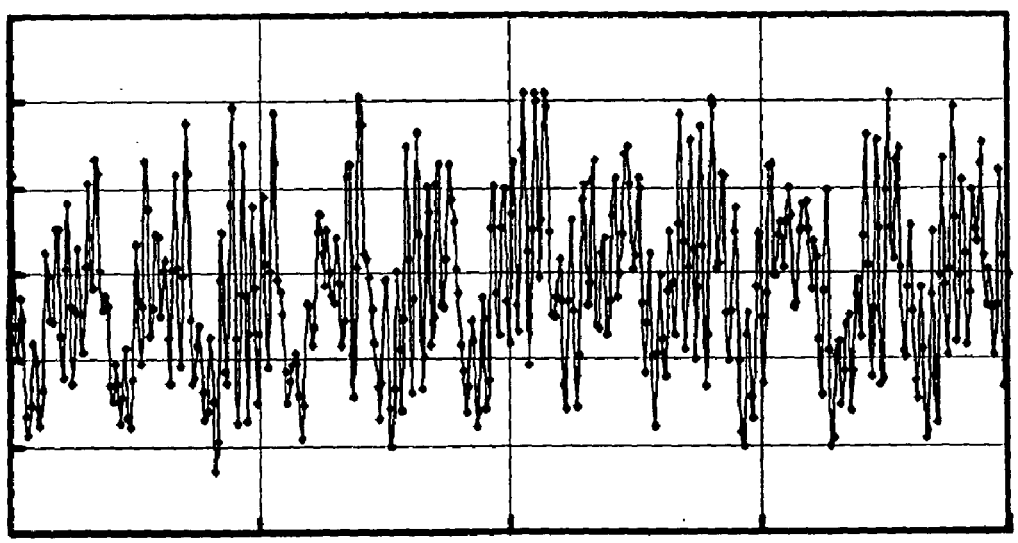
FIG. 13 is a graph showing an example of the light intensity distribution of diffracted light from the one-dimensional type diffraction control element in a case where light is not transmitted through the slit element.
Figure 14:
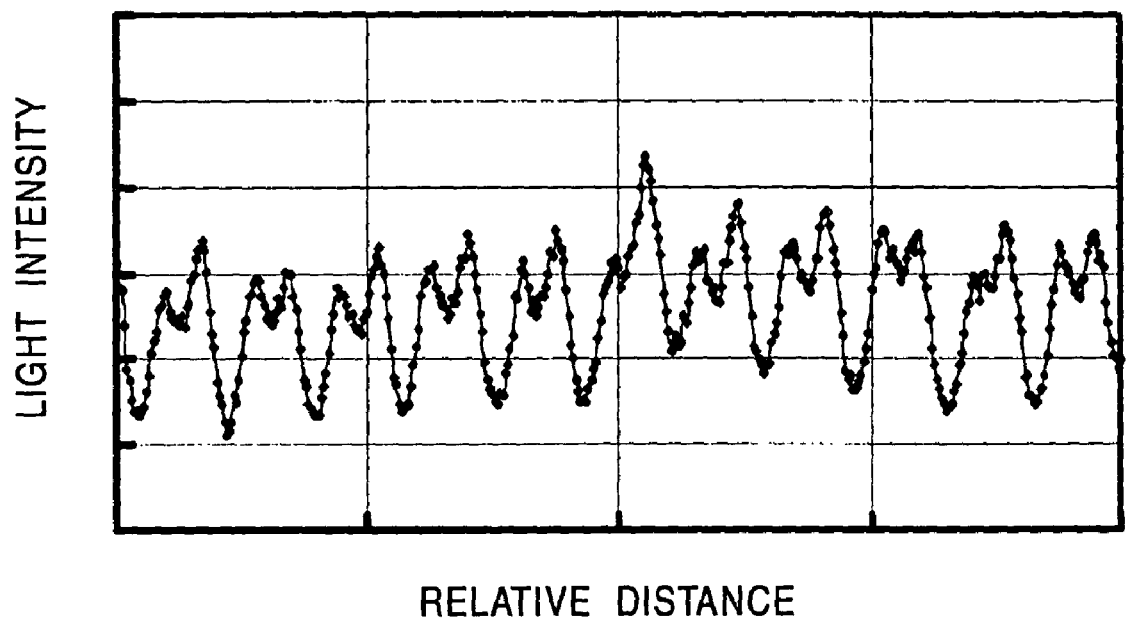
FIG. 14 is a graph showing an example of the light intensity distribution of the diffracted light from the one-dimensional type diffraction control element in a case where light is transmitted through the slit element shown in FIG. 12.
Figure 15:
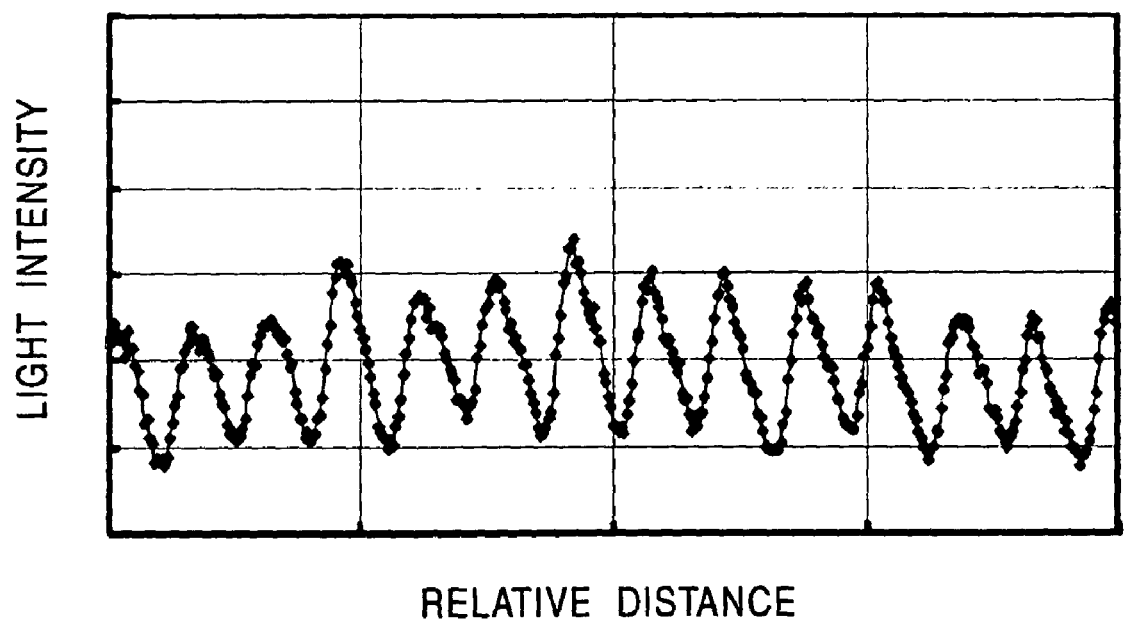
FIG. 15 is a graph showing an example of the light intensity distribution of the diffracted light from the one-dimensional type diffraction control element in a case where light is transmitted through a slit element having a narrower slit width than the slit element shown in FIG. 12.

FIG. 13 through FIG. 15 are graphs showing the distribution of the white levels of the diffracted light beams from the one-dimensional type diffraction control element 40 with the set widths (1) through (3). As in the cases illustrated in FIGS. 9 and 12, the distribution of the white level is measured by receiving only signal light through the one-dimensional type light receiving element similar to the one-dimensional type light receiving element 60.

As in the case illustrated FIG. 9, it is understood from FIG. 13 that the diffracted light beams generated by the one-dimensional type diffraction control element 40 include more noises in the case of setting (1) wherein the diffracted light beams are not passed through the slit element 50.

On the other hand, it can be seen that the waveform shown in FIG. 14 indicates a signal closer than the one shown in FIG. 13 to the desired signal to be reproduced, because the ratio of 1 to 0 of the waveform shown in FIG. 14 is 2 to 1, indicating that the original signal has been stored.

Meanwhile, the waveform shown in FIG. 15 indicates that the ratio of 1 to 0 is 1 to 1, showing that the original signal has been lost, as compared with the one in FIG. 14.

As described above, if the width of the slit 51 is set too narrow, then the reproducibility of a signal may be deteriorated in some cases.

If three consecutive individual diffraction control elements 41 or pixels show the repetition of "110" or "001," then the repetition will be reflected also in the pattern of diffracted light beams emergent from the one-dimensional type diffraction elements 40. This is because the intervals or cycles of the repetition correspond to the intervals of the diffraction gratings. As a result, the diffracted light beams as signals will include the secondary diffracted light beam L±12 from the individual diffraction control elements 41 as a component thereof. The pattern may appear in data for recording and/or reproduction. Preferably, therefore, the slit 51 allows the secondary diffracted light beam L±12 to pass therethrough.

The secondary diffracted light beam L±12 in the pattern in which "110" or "001" is repeated is not the same as the diffracted light beam L±12 shown in FIG. 10. This is because the intervals of diffracted light beams change according to pattern repetition intervals, i.e., grating intervals of diffraction gratings. The diffracted light beam L±12 in this pattern is positioned between the diffracted light beams L±11 and L±12 in the repetitious pattern of "1,0" shown in FIG. 10. The position may be expressed in the form of decimal points as L±1, 1.33, meaning a first 1.33-order diffracted light beam.

(Operation of the Hologram Recording Apparatus 100)

A. Recording Data in the Hologram Recording Medium M (Refer to FIGS. 1 and 2)

A laser beam emitted from the laser source 10 passes through the one-dimensional type beam expander 20, which expands the beam diameter of the laser beam in direction Y, then the laser beam is split into two light beams, namely, a reference light beam and a signal light beam, by the half mirror 30.

The reference light beam passes through the convex lens 84 and it is condensed onto the hologram recording medium M.

The signal light beam is converged in direction X through a cylindrical lens 71 and incident upon the one-dimensional type diffraction control element 40. As previously described, each of the individual diffraction control elements 41 independently takes two diffraction states (OFF: "1" and ON: "0"), thus making it possible to represent data of the number of bits equivalent to the number of the individual diffraction control elements 41 of the entire one-dimensional type diffraction control element 40. For instance, if there are 1,088 individual diffraction control elements 41, then 1088-bit data can be expressed.

The diffracted light beam that has been diffracted by the one-dimensional type diffraction control element 40 is converged by the convex lens 81, then transmitted through the slit element 50 so as to cut off unwanted diffracted light beams, thus reducing noises. As a result, the two diffraction states (OFF and ON) of the individual diffraction control element 41 are separated from each other, and the display pattern of the one-dimensional type diffraction control element 40 will be accurately reflected on the signal light beam, leading to an improved signal-noise ratio.

The diffracted light beams whose diffraction states have been converted into white levels are transmitted through the convex lenses 82 and 83, and condensed onto the hologram recording medium M. At this time, both reference light beam and the signal light beam are condensed substantially at the same spot of the hologram recording medium M. This causes interference fringes to be formed on the hologram recording medium M, and the refraction index of the hologram recording medium M varies according to the interference fringes. At this time, since the signal-noise ratio of the signal light beam has been improved, the signal recorded in the hologram recording medium M will also have an improved signal-noise ratio.

Thus, refraction index distribution of the hologram recording medium M is established on the basis of the binary state of each individual diffraction control element 41 of the one-dimensional type diffraction control element 40, allowing data to be recorded in the hologram recording medium M. For instance, if there are 1,088 individual diffraction control elements 41, then 1088-bit data is recorded by exposing the hologram recording medium M once by using the one-dimensional type diffraction control element 40.

By shifting the spot where the reference light beam and the signal light beam are condensed to subject the hologram recording medium M to exposure a plurality of times, data of bits of a multiple of the number of the individual diffraction control elements 41 can be recorded in the hologram recording medium M.

B. Reproducing Data from the Hologram Recording Medium M

Figure 16:
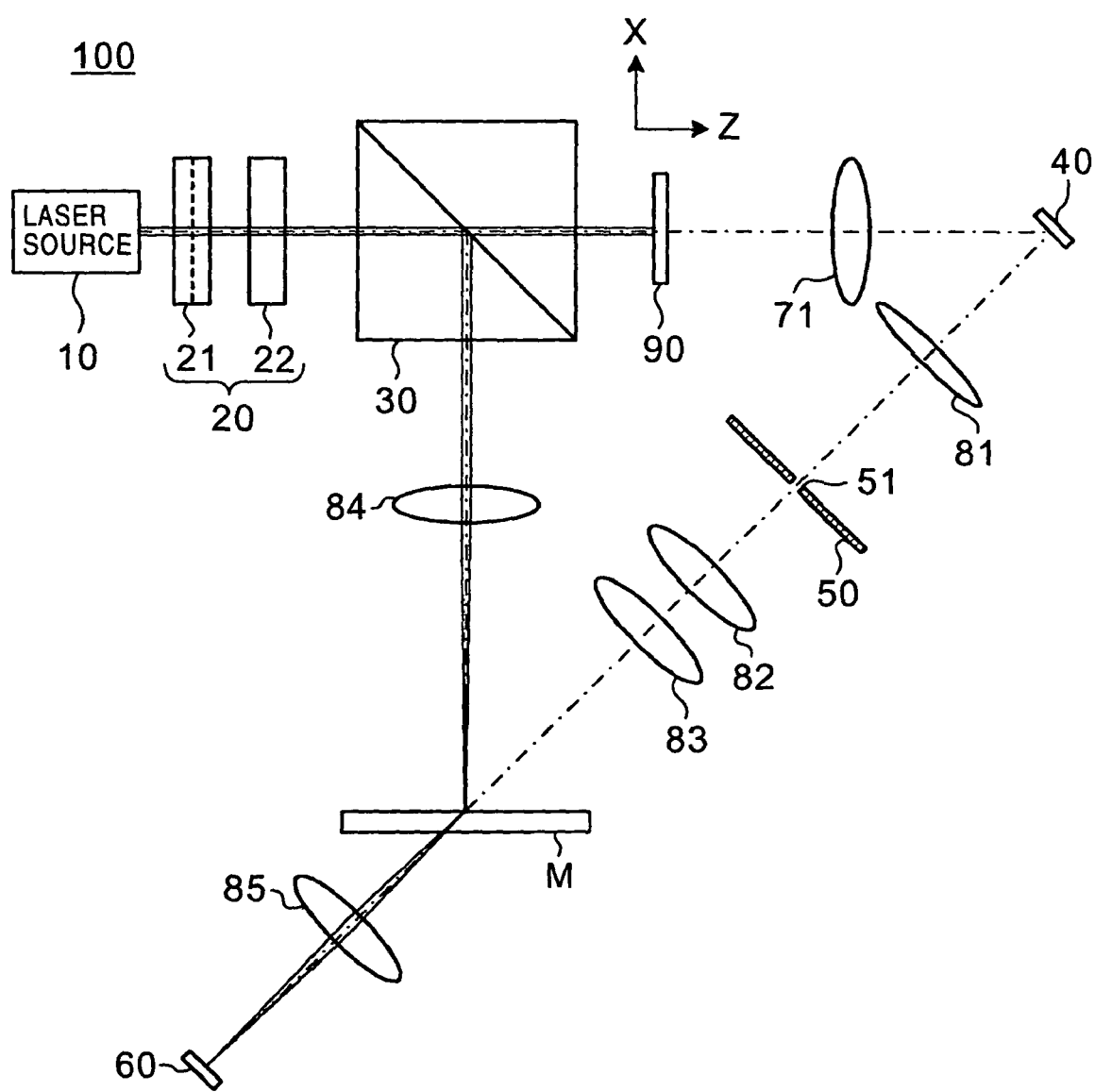
FIG. 16 is a schematic diagram illustrating how data from a hologram recording medium is reproduced by the hologram recording apparatus.

FIG. 16 is a schematic diagram showing how data is reproduced from the hologram recording medium M by the hologram recording apparatus 100.

To reproduce data from the hologram recording medium M, out of the two light beams, namely, a reference light beam and a signal light beam obtained from the light beam emitted from the laser source 10 and split by the half mirror 30, the signal light beam is blocked by a shielding plate 90 so as to allow only the reference light beam to pass through the convex lens 84 and be condensed on the hologram recording medium M. In order to prevent the light beam reflected off the shielding plate 90 from being mixed in the reference light beam with a resultant noise, the shielding plate 90 is preferably inclined slightly with respect to an incident light beam. Use of a regular mirror in place of the half mirror 30 will obviate the need for the shielding plate 90.

The reference light beam entering the hologram recording medium M is diffracted by the refraction index distribution in the hologram recording medium M, producing a signal light beam. The produced signal light beam is emitted from an extended line in the direction in which the signal light beam for recording advanced when the signal light beam entered at the time of recording in the hologram recording medium M. The reproduced signal light beam is converged by the convex lens 85 and led into the one-dimensional type light receiving element 60. In the one-dimensional type light receiving element 60, the data recorded in the hologram recording medium M can be reproduced in terms of the white level of the light beams received by individual light receiving elements.

At this time, since the data has been recorded in the hologram recording medium M at a good signal-noise ratio, the signal-noise ratio of the produced signal will be also good, leading to improved reproducibility of the data.

Second Embodiment

Figure 17:
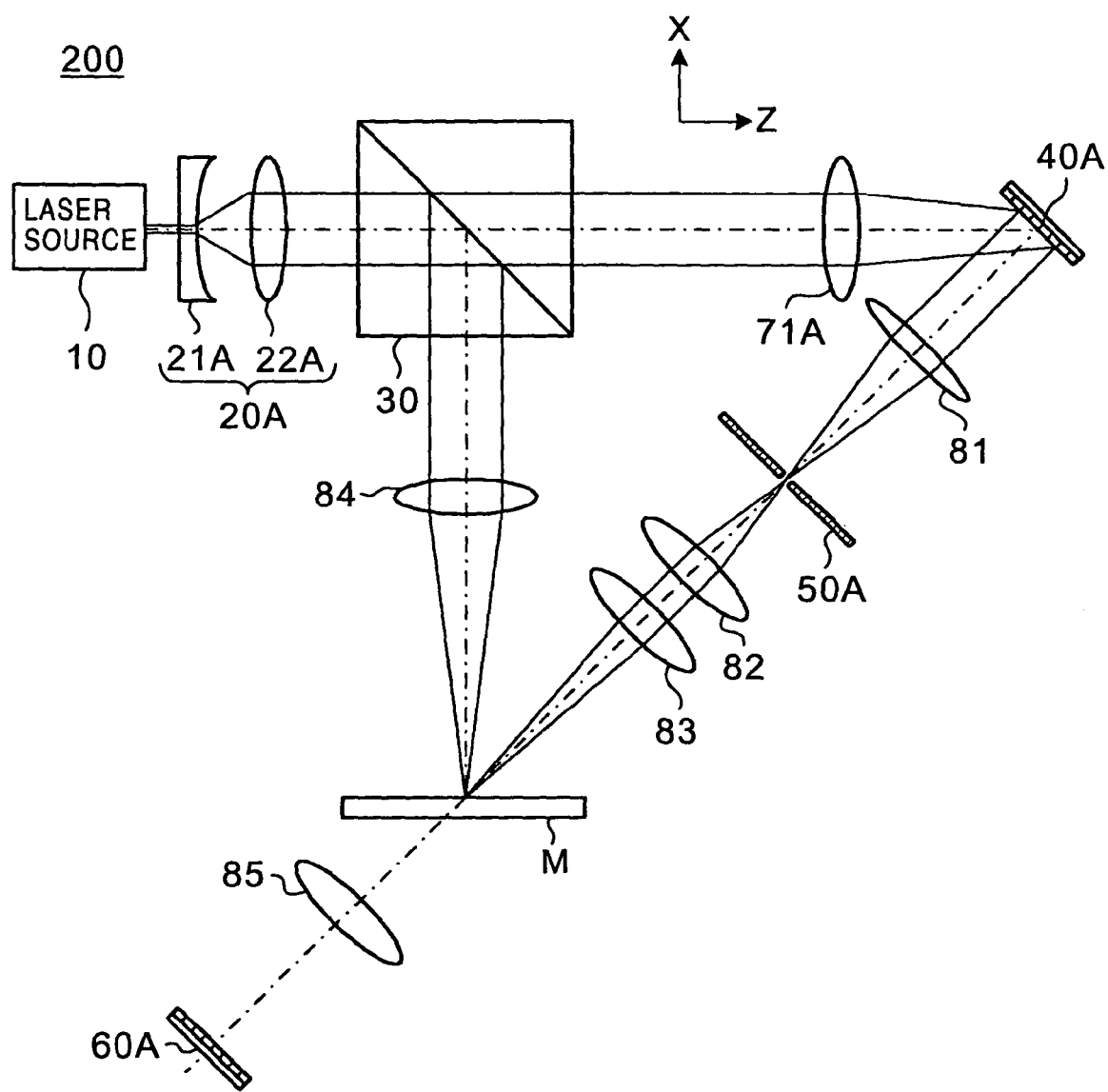
FIG. 17 is a schematic diagram showing a hologram recording apparatus in accordance with a second embodiment of the present invention.

FIG. 17 is a schematic diagram showing a hologram recording apparatus 200 in accordance with a second embodiment of the present invention.

Referring to FIG. 17, the hologram recording apparatus 200 is constructed of a laser source 10, a two-dimensional type beam expander 20A, a half mirror 30, a two-dimensional type diffraction control element 40A, a pinhole element 50A, a two-dimensional type light receiving element 60A, a convex lens 71A, and convex lenses 81 through 85 to record and reproduce information in and from a hologram recording medium M.

Basically, the hologram recording apparatus 200 uses the two-dimensional type diffraction control element 40A in place of the one-dimensional type diffraction control element 40 of the hologram recording apparatus 100. The two-dimensional type diffraction control element 40A has the aforesaid individual diffraction control elements 41 planarly arranged in two directions. This arrangement permits an increased amount of information that can be recorded at a time and also permits further higher recording speed per bit in the hologram recording medium M, as previously mentioned.

Because of the use of the two-dimensional type diffraction control element 40A, the two-dimensional type beam expander 20A combining a regular concave lens 21A and a regular convex lens 22A replaces the one-dimensional type beam expander 20, a pinhole element 50A replaces the slit element 50, and a convex lens 71A replaces the cylindrical lens 71. The pinhole element 50A has a substantially circular slit 51A (extremely small aperture). Furthermore, a two-dimensional type light receiving element 60A is used in place of the one-dimensional type light receiving element 60.

The two-dimensional type beam expander 20A and the convex lens 71A are used to apply a laser beam to all pixels of the two-dimensional type light receiving element 60A. The pinhole element 50A is used because the diffractive directions of the diffracted light beams from the two-dimensional type diffraction control element 40A will be two-dimensional. Similarly, the two-dimensional type light receiving element 60A is provided to be compatible with the two-dimensional type diffraction control element 40A.

The basic operation of the hologram recording apparatus 200 is substantially the same as that of the hologram recording apparatus 100; therefore, the description thereof will be omitted.

Other embodiments

The present invention is not limited to the embodiments described above and various changes and modifications can be made within the spirit and scope of the present invention.

For example, a general diffraction grating whose diffraction state can be controlled may be used in place of the one-dimensional type diffraction control element or the two-dimensional type diffraction control element. The number of the ribbons of each individual diffraction control element 41 is not limited to six, and there may be more or less ribbons. At this time, the diffracted light beams produced by the individual diffraction control elements 41 that match the diffracted light beams produced by the ribbons 42 will not be every sixth one even when every other individual diffraction control elements 41 are set to ON.

As the diffraction gratings, various types of diffraction gratings may be used other than the phase difference type adapted to impart a phase difference to each of the diffracted light beam from the ribbons.

Furthermore, the ribbons constituting the diffraction control element are regarded as phase-variable elements or phase modulating elements, as described above, phase-variable elements may be combined to make up a diffraction grating. In other words, a general one-dimensional or two-dimensional phase modulating element may be used in place of the one-dimensional or two-dimensional type diffraction control element to constitute the hologram recording apparatus.

What is claimed is:

1. A hologram recording apparatus comprising:
    a laser source emitting laser beams;
    a diffraction control element for receiving a laser beam emitted from the laser source and controlling a diffraction of the received laser beam before letting the laser beam exit;
    a diffracted light component blocking element configured to block a predetermined diffracted light component in the diffracted light emitted from the diffraction control element; and
    a first condensing element for condensing a diffracted light component that has not been blocked by the diffracted light component blocking element onto a hologram recording medium, wherein
    the diffraction control element has a plurality of individual diffraction control elements that control the diffraction of the received laser beam independently from each other and the individual diffraction control elements have even numbers of phase control elements for controlling phase differences among outgoing light from each element so that the zero order diffracted light cancel each other, resulting in zero intensity, and
    the diffracted light component blocking element blocks tertiary diffracted light or more in terms of an absolute value and allows secondary diffracted light in terms of an absolute value to pass by the individual diffraction control element.

2. The hologram recording apparatus according to claim 1, wherein
    the phase control elements are ribbons that are driven to the up or down position alternately.

3. The hologram recording apparatus according to claim 2, wherein the phase control elements are displaced by an electrostatic force.

4. The hologram recording apparatus according to claim 1, wherein the first condensing element comprises a plurality of lenses.

5. The hologram recording apparatus according to claim 1, further comprising:
   a light dividing element for dividing a laser beam emitted from the laser source into first and second light beams and causing the first light beam to enter the diffraction control element; and
   a second condensing element for condensing the second light beam emitted from the light dividing element onto a spot on the hologram recording medium where a laser beam emitted from the second condensing element has been condensed.

6. The hologram recording apparatus according to claim 5, further comprising:
   a light blocking element for blocking the first light beam emitted from the light dividing element; and
   a light receiving element for receiving light emitted from the hologram recording medium on the basis of the laser beam converged onto the hologram recording medium by the second condensing element.

7. A hologram recording method comprising:
   a diffraction control step for controlling a diffraction of a laser beam by a diffraction control element, before letting the laser beam exit;
   a diffracted light component blocking step for blocking a predetermined diffracted light component in the diffracted light emitted in the diffraction control step; and
   a condensing step for condensing a diffracted light component that has not been blocked in the diffracted light component blocking step onto a hologram recording medium, wherein the diffraction control element has a plurality of individual diffraction control elements that control the diffraction of the received laser beam independently from each other and the individual diffraction control elements have even numbers of phase control elements for controlling phase differences among outgoing light from each element so that the zero order diffracted light cancel each other, resulting in zero intensity, and the diffracted light component blocking element blocks primary diffracted light or more in terms of absolute value by the phase control elements and blocks tertiary diffracted light or more in terms of an absolute value and allows secondary diffracted light in terms of an absolute value to pass by the individual diffraction control elements.

8. A hologram recording medium for recording data, as changes in refraction index of the recording medium, by using diffracted light obtained by blocking, with a diffracted light component blocking element, a predetermined diffracted light component in diffracted light emitted from a diffraction control element that-controls the diffraction of a laser beam before letting the laser beam exit, wherein the diffraction control element has an even numbers of phase control elements for controlling phase differences among outgoing light from each element so that the zero order diffracted light cancel each other, resulting in zero intensity, and the diffracted light component blocking element blocks tertiary diffracted light or more in terms of an absolute value and allows secondary diffracted light in terms of an absolute value to pass by the individual diffraction control elements.

* * * * *